United States Patent [19]
Nohira

[11] 4,041,913
[45] Aug. 16, 1977

[54] EXHAUST GAS RECIRCULATING SYSTEM
[75] Inventor: Hidetaka Nohira, Susono, Japan
[73] Assignee: Toyota Jidosha Kogyo Kabushiki Kaisha, Toyoda, Japan
[21] Appl. No.: 608,975
[22] Filed: Aug. 29, 1975
[30] Foreign Application Priority Data Feb. 22, 1975  Japan .................................. 50-22038

[51] Int. Cl.² ......................... F02B 33/00; F02M 7/00
[52] U.S. Cl. .............................................. 123/119 A
[58] Field of Search .................................... 123/119 A

[56] References Cited
U.S. PATENT DOCUMENTS

| | | | |
|---|---|---|---|
| 3,646,923 | 3/1972 | Sarto | 123/119 A |
| 3,868,934 | 3/1975 | Mick | 123/119 A |
| 3,901,202 | 8/1975 | Hollis | 123/119 A |
| 3,924,589 | 12/1975 | Nohira | 123/119 A |
| 3,930,475 | 1/1976 | Lewis | 123/119 A |
| 3,937,194 | 2/1976 | Tamaki | 123/119 A |
| 3,962,868 | 6/1976 | Matumoto | 123/119 A |
| 3,970,052 | 7/1976 | Andoh | 123/119 A |
| 3,970,061 | 7/1976 | Caldwell | 123/119 A |
| 3,972,312 | 8/1976 | Walker | 123/119 A |

Primary Examiner—Carroll B. Dority, Jr.
Assistant Examiner—Daniel J. O'Connor
Attorney, Agent, or Firm—Stevens, Davis, Miller & Mosher

[57] ABSTRACT

An exhaust gas recirculating system including two flow rate control valves which are actuated by means of diaphragms. The negative pressure in the intake system of an engine is independently introduced into diaphragm chambers of the aforesaid two flow rate control valves. Thus, the total quantity of recirculating gases is controlled by taking as a reference the quantity of the recirculating exhaust gases being introduced into a first flow rate control valve and adding to the aforesaid reference quantity the quantity of the recirculating exhaust gases being introduced into a second flow rate control valve. In addition, means which are controlled by controllers adapted to issue command signals upon receipt of signals from sensors adapted to detect the running conditions of an engine and a vehicle are built in the negative pressure pipes which communicate the intake system of an engine with the diaphragm chambers of the respective flow rate control valves, so that timing to recirculate exhaust gases and the flow rate of the exhaust gases may be controlled.

8 Claims, 11 Drawing Figures

EXHAUST GAS RECIRCULATING SYSTEM

BACKGROUND OF THE INVENTION

This invention relates to an exhaust gas recirculating system for use in an engine of a motor vehicle.

Exhaust gas recirculating systems (this will be referred to as EGR system, hereinafter) for internal combustion engines has found wide use in motor vehicles, because of the application of strict regulation of the public nuisance arising from exhaust gases in an effective attempt to reduce the quantity of harmful nitrogen oxides (this will be referred to as NOx, hereinafter) from the engine. As a result, there have been proposed many systems of this kind. However, those attempts are mostly directed to providing a so-called proportioning type EGR system, in which exhaust gases of a quantity proportional to the quantity of the intake air flow into the engine or the quantity of the exhaust gas flow is recirculated.

However, the proportioning type EGR system suffers from shortcomings in that, since the degree of EGR in the range covering from low load to high load conditions of an engine, i.e., the ratio of the quantity of exhaust gases being recirculated to that of the intake air in the engine is constant, if the degree of the EGR is increased for enhancing the NOx reducing effect in the low load range of an engine, then there results an increase in the ratio of the quantity of inert gases including the residual gases within a cylinder (so-called internal EGR) plus exhaust gases introduced from the exterior of the engine to the quantity of intake air. This in turn leads to instable combustion within an engine cylinder, thus neutralizing the EGR effect.

The mode of an engine for achieving desired EGR characteristic is such that, as best shown by a dotted line in FIG. 10, there is shown a peak in the medium and high load ranges of an engine. The prior art EGR systems are intended to achieve the aforesaid characteristic. However, they fail to achieve the variable EGR characteristic, as shown by the dotted line in FIG. 10, because there is provided only one outlet for recirculating exhaust gases travelling through a flow rate control valve (In general, a single flow rate control valve is provided), which is communicated with the aforesaid exhaust port, into the intake system of an engine.

SUMMARY OF THE INVENTION

It is accordingly an object of the present invention to provide an exhaust gas recirculating system which may reduce the quantity of exhaust gases to be recirculated at the time of a low load condition of an engine, and may increase the quantity of exhaust gases to be recirculated at the time of medium and high load conditions of the engine, thereby reducing the quantity of NOx over the entire range of the load conditions and presenting a stable running condition, even in the case of a low load condition of an engine.

It is another object of the present invention to provide an exhaust gas recirculating system, in which the optimum timing to commence the recirculation of exhaust gases is controlled, based on the running conditions of the engine, rather than any other conditions of the vehicle.

According to the exhaust gas recirculating system of the invention, two diaphragm type flow control valves of the same type are built in between the exhaust system and the intake system of an engine. The interior of each flow rate control valve is sealingly divided by means of a single diaphragm into one diaphragm chamber and one chamber which has one inlet and one outlet. Secured to the diaphragm is a valve stem which protrudes into the valve chamber, while a valve body is secured to the tip of the valve stem. The inlets and outlets of the respective flow control valves are communicated with the exhaust system of the engine, while the outlet of the first flow rate control valve is communicated with an air supply system in the position upstream of the throttle valve of the engine, while the outlet of the second flow rate control valve is communicated with the air supply system of the engine in the position adjacent to the point of the first flow rate control valve being communicated with the intake system thereof. On the other hand, the diaphragm chamber of the first flow rate control valve is communicated with the intake system in a position slightly upstream of the closed position of a throttle valve of an engine, while the diaphragm chamber of the second flow rate control valve is communicated with the intake system of the engine in a position slightly upstream of the first flow rate control valve being communicated with the intake system.

Accordingly, the first flow rate control valve may maintain constant the degree of EGR (i.e., the ratio of the quantity of exhaust gases to be recirculated to that of intake air), over the entire range of the throttle openings except for the opposite extremities of the throttle openings. On the other hand, the second flow rate control valve may reduce the degree of EGR with an increase in the throttle openings. As a result, the use of the combination of the two flow rate control valves may present a desired degree of EGR in terms of the reduction of NOx, over the entire range of openings of the throttle valve.

As is apparent from the foregoing, exhaust gases to be recirculated are controlled in two stages, thereby enabling the desired control of exhaust gases over the entire range of openings of the throttle valve, in contrast to the prior art EGR system. In particular, the prior art proportioning type EGR system presents a higher degree of EGR in the low load running condition of an engine and thus impairs the ignitibility. This shortcoming is completely avoided by the EGR system according to the present invention.

In addition, built in the negative pressure pipe communicating the diaphragm chambers of the first and second flow rate control valves with the intake system of an engine is a three-way valve controlled by means of a controller which issues a command signal upon receipt of a signal from a sensor adapted to detect the running conditions of the engine and the vehicle. This enables control of the flow rate of the exhaust gases to be recirculated as well as the timing to recirculate exhaust gases, commensurate to the running conditions of the engine and the vehicle, thereby further enhancing the NOx reducing effect.

These and other objects and features of the present invention will be apparent from a reading of the following specification in conjunction with the accompanying drawings which show the embodiments of the invention.

DESCRIPTION OF THE PREFERRED EMBODIMENTS

Figure 1:
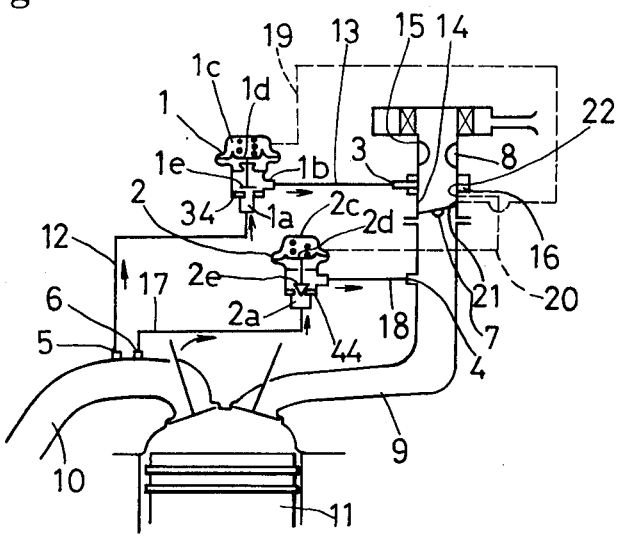
FIG. 1 is a schematic diagram of the exhaust gas recirculating system, in which two flow rate control valves are mounted separately.

Referring now to FIG. 1, there is shown a fundamental arrangement of the EGR system according to the present invention. More particularly, the inlet 1a of a first flow rate control valve of a known diaphragm type is communicated by way of an EGR pipe 12 with a recirculating exhaust gas outlet 5 of an exhaust system 10, while the outlet 1b thereof is communicated with an intake system 9 in the position between a throttle valve 7 of a carburetor and a venturi 8, i.e., by way of an inlet 3 and an EGR pipe 13 which extends through a spacer 16 interposed between a flange 14 of a carburetor and the body 15 thereof.

On the other hand, the diaphragm chamber 1c of the first flow rate control valve 1 is communicated by way of a negative-pressure pipe 19 with a negative-pressure port 21 which is located slightly upstream of the closed (idle) position of the throttle valve 7 of the carburetor. The inlet 2a of the second flow rate control valve 2 of a known diaphragm type is communicated by way of an EGR pipe 17 with an outlet 6 adapted to take out exhaust gases therethrough, while the outlet 2b thereof is communicated by way of an EGR pipe 18 with an inlet 4 which is located downstream of the throttle valve 7, i.e., an inlet 4 provided in the intake system 9, as viewed in the drawing. On the other hand, the diaphragm chamber 2c of the second flow rate control valve 2 is communicated by way of a negative-pressure pipe 20 with a negative-pressure port 22 which is located above the negative-pressure port 21. These flow rate control valves 1, 2 are opened and closed by means of valve bodies 1e, 2e which cooperate with diaphragm 1d, 2d adapted to be actuated due to the negative-pressures at the negative-pressure ports 21 22, the aforesaid negative-pressure being dependent on the opening of the throttle valve 7 and the intake negative-pressure of an engine.

Figure 2:
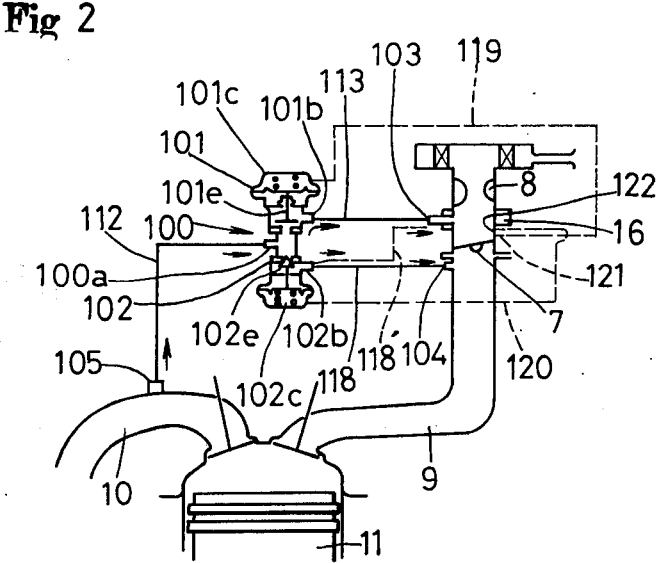
FIG. 2 is a schematic diagram of the exhaust gas recirculating system, in which two flow rate control valves are mounted in integral fashion, with only the inlet thereof being used in common.

FIG. 2 shows a single flow rate control valve 100, in which two flow rate control valves 101, 102 corresponding in function to the flow rate control valves 1, 2 of FIG. 1 are combined in an integral fashion, the common inlet 100a thereof being communicated by way of an EGR pipe 112 with the outlet 105 of the exhaust system 10. Description will be omitted of the arrangement of the other EGR pipes 113, 118 and negative-pressure pipes 119 120, because of their similarity to those shown in FIG. 1. The EGR shown by a dotted line 118' communicates the outlet 102b of the second flow rate control valve 102 with the inlet 103, through which recirculating exhaust gases are introduced into the intake system 9.

Figure 3:
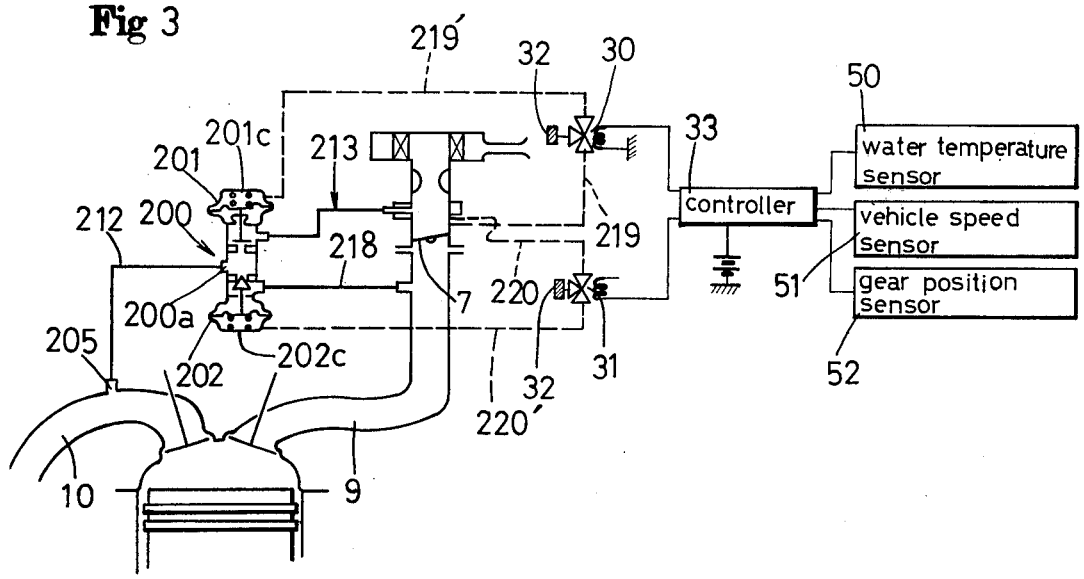
FIG. 3 is a schematic diagram of the exhaust gas recirculating system, in which there is built in the negative pressure pipe of the system of FIG. 2 a three-way electromagnetic valve adapted to be opened and closed by means of a controller which issues a command signal upon receipt of a signal from a sensor adapted to detect water temperature, vehicle speed and position of a transmission gear.

FIG. 3 shows one example of negative-pressure switching means which are three way electromagnetic valves 30, 31 built in negative-pressure pipes 119, 120 of FIG. 2. The three way electromagnetic valve 30 is communicated by way of a negative-pressure pipe 219' with a diaphragm chamber 201c of the first flow rate control valve 201, as well as by way of a negative-pressure pipe 219 with the intake system 9 in the position slightly upstream of the closed (idle) position of the throttle valve 7. The three way electromagnetic valve 30 is adapted to communicate the negative-pressure pipes 219, 219' with each other upon receipt of a signal from a controller 33, while the controller 33 excites the three way electromagnetic valve 30 to communicate the negative-pressure pipes 219, 219' with each other upon receipt of a signal which is issued when sensors 50, 51, 52 adapted to detect the water temperature of the engine, vehicle speed and transmission gear position detect the predetermined running conditions which have been programed beforehand. On the other hand, the three way electromagnetic valve 31 is communicated by way of a negative-pressure pipe 220' with the diaphragm chamber 202c of the second flow rate control valve 202 as well as by way of negative-pressure pipe 220 with the intake system 9 in the position upstream of the point of the negative-pressure pipe 219 being communicated with the intake system 9. Meanwhile, the three way electromagnetic valve 31 as well is excited according to a signal from the controller 33 as in the case with the three way electromagnetic valve 30, as shown. Description will be omitted of the arrangement of the respective EGR pipes 212, 213, 218, because of their similarity to those of FIG. 2.

Figure 4:
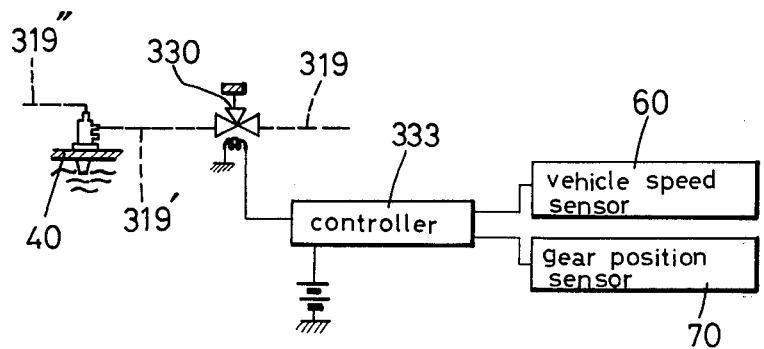
FIG. 4 shows an embodiment of another control mechanism, in which there is provided in the negative-pressure pipe a mechanism adapted to mechanically switch the negative-pressure pipe for opening or closing same according to thermal expansion of wax, in place of a water temperature sensor.
Figure 5:
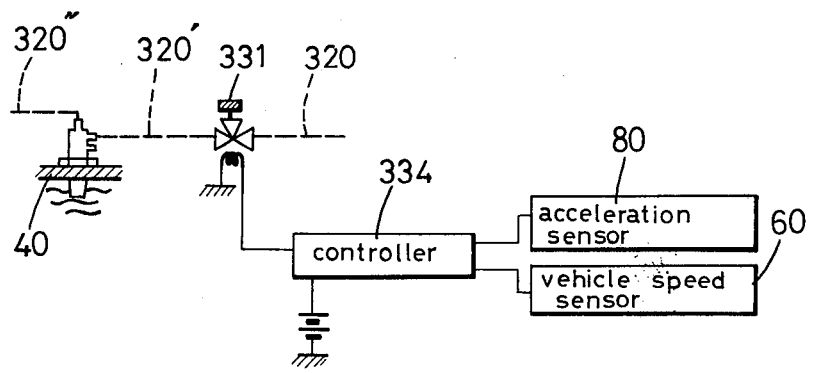
FIG. 5 illustrates one embodiment of a control mechanism using sensors for acceleration and vehicle speed, in place of the sensors for vehicle speed and gear position.

FIGS. 4 and 5 show other embodiments, in which three way electromagnetic valves 330, 331 are excited by means of a water temperature controller 40 which is located midway of negative-pressure pipes 219' and 220' and adapted to sense the water temperature in an engine to thereby mechanically switch the negative-pressure pipes from one to another by utilizing the heat expansive characteristic of wax, as well as by means of controllers 333 and 334 which are adapted to issue signals by detecting the vehicle speed, transmission gear position, acceleration and the like, so that the negative-pressure pipes 319', 319 and 320' and 320 are switched from their closed positions to open positions.

Figure 6:
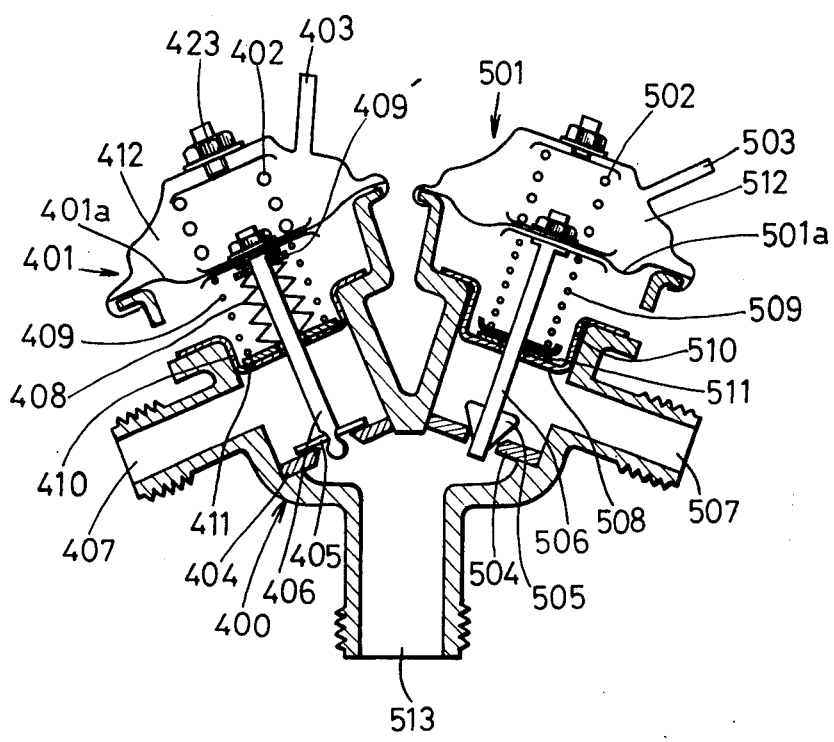
FIG. 6 is a view of one embodiment of two flow rate control valves which are assembled in integral fashion.

FIG. 6 shows another embodiment of an integral type flow rate control valve of FIG. 3, in which a first flow rate control valve 401 and a second flow rate control valve 501 are built in a body proper 400 thereof according to a 'V' type connection. The first flow rate control valve 401 consists of a known type diaphragm 401a, diaphragm chamber 412, spring 402 in the diaphragm chamber 412, sensing pipe 403 attached in the diaphragm chamber 412, flow rate control throttle 404, plate valve body 405, valve stem 406, exhaust gas outlet 407, gas seal bellows 408, bellow-retaining spring 409', seal plate 410, and heat insulating plate 411. On the other hand, the second flow rate control valve 501, as well, consists of a diaphragm 501a, spring 502, sensing pipe 503, flow rate control throttle 504, tapered valve body 505, valve stem 506, exhaust gas outlet 507, plate 508, spring 509, seal plate 510, heat insulating plate 511, and diaphragm chamber 512. Shown at 513 is an inlet for exhaust gases which inlet is provided in the body proper 400. Thus, the exhaust gases which have passed through the inlet 513 are distributed to the first control valve 401 and the second control valve 501. Meanwhile, the reasons why the valve body 405 of the first control valve 401 is provided in the form of a flat plate and the reason why the valve body 505 of the second control valve 501 is provided in a tapered fashion is that they are advantageous in preventing the leakage of exhaust gases from valve seats upon the closure of the valves, and in enabling the flow rate control of exhaust gases according to the area-controlling system by varying the degree of the taper, in association with the negative pressure in the diaphragm chamber 512. This is because the exhaust gas outlet 407 of the first control valve 401 is communicated with the air supply system 9 located downstream of the venturi 8, the pressure thereat being substantially equal to atmospheric pressure, as shown in FIGS. 1 and 2, so that the quantity of exhaust gases from the exhaust gas outlet 407 will be proportional to the quantity of air being introduced and, as a result, as far as the air quantity is constant, the quantity of exhaust gases being introduced will be maintained constant, whereas the exhaust gas outlet 507 of the second control valve 501 is communicated with the intake system 9 in the position downstream of the carburetor throttle valve 7, presenting a negative pressure thereat.

Turning now to the operation of the flow rate control valves of the aforesaid arrangement:

i. with reference to the characteristic of the first flow rate control valve 1;

As shown in FIG. 1, when a vehicle travels in a low load condition (a flat road travelling mode), there results a small opening of the throttle valve 7, so that the diaphragm chamber 1c will be communicated with the intake system 9 and thus the first flow rate control valve 1 will be opened. As a result, exhaust gases are introduced from the exhaust system 10 into a space confined between the throttle valve 7 and the venturi 8, i.e., into the pressure-recovery space in the intake system 9, so that the pressure Po at the inlet 3 is maintained substantially at atmospheric pressure. On the other hand, the pressure at the outlet 5 of exhaust gases in the exhaust system 10 is dependent on the pressure Pr of exhaust gases, which pressure Pr in turn is in proportion to the square of the quantity Ga of intake air. As a result, assume the flow coefficient C of exhaust gas pipes 12, 13 covering between the outlet 5 and the inlet 3, including the flow rate control throttle 34 (whose area is assumed as being A) of the first flow rate control valve 2, and the mean constant K thereof, then the quantity $Ge_1$ of exhaust gases is expressed by the following formula:

$$Ge_1 = K \cdot C \cdot A \sqrt{Pr - Po}. \tag{1}$$

On the other hand, Po = O, and Pr ∝ $Ga^2$ then the formula (1) is expressed as follows:

$$Ge_1 = K'Ga \quad (K': \text{constant}) \tag{2}$$

Thus, exhaust gases of a quantity proportional to the quantity Ga of intake air in an engine is passed through the first flow rate control valve 1 and recirculated into the intake system 9.

In the range, in which the opening of the throttle valve 7 is small and the negative pressure at the negative pressure port 21 is not at a level which may open the first flow rate control valve 1, or in the range, in which the intake negative pressure in an engine is lower than the valve-opening pressure in the first flow rate control valve 1 at the fully open load, the first flow rate control valve 1 is maintained closed, so that exhaust gases are not discharged as shown by the opposite extremities of the characteristic curve representing the degree of EGR or the ratio of the quantity of exhaust gases being recirculated to the quantity of intake air, while in the EGR range the quantity of the exhaust gases to that of the intake air is constant, thus presenting a linear equation.

ii. Description will be given of the characteristic of the second flow rate control valve 2. When a vehicle is in the accelerating or high load condition, there results in a large opening of the throttle valve 7, and hence there prevails an intake negative-pressure at the negative-pressure port 22, so that the valve body 2 of the second flow rate control valve 2 is lifted due to the aforesaid negative pressure. The outlet 2b of the second flow rate control valve 2 is communicated with the inlet 4 which is provided in the intake system 9 in a position downstream of the throttle valve 7, so that the recirculating exhaust gases are pushed back by the pressure Pr of exhaust gases, while being strongly sucked into the intake system 9 due to the intake negative-pressure Pb.

Assuming the area A' of the throttle valve 44 of the second flow rate control valve 2 and flow coefficients C' of the EGR pipes 17, 18, then the quantity $Ge_2$ of exhaust gases to be recirculated by means of the second flow rate control valve 2 is expressed by the following formula:

$$Ge_2 = K''C'A' \sqrt{Pr - Pb} \tag{3}$$

Figure 9:
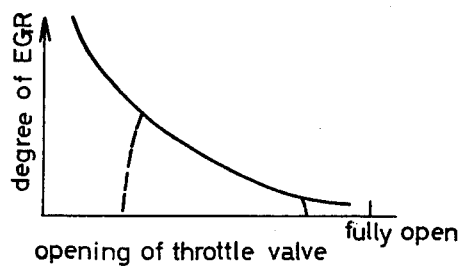
FIG. 9 is a plot showing the EGR characteristic curve of the second flow rate control valve.

This characteristic is such that the lower the load (small throttle opening), the higher will be the degree of EGR, as shown in FIG. 9.

iii. According to the present invention, since the recirculating exhaust gases are introduced through the aforesaid two flow rate control valves 1, 2 into the intake system, the quantity Ge of the total recirculating gases is given as follows:

$$Ge = Ge_1 + Ge_2 \tag{4}$$

Figure 7:
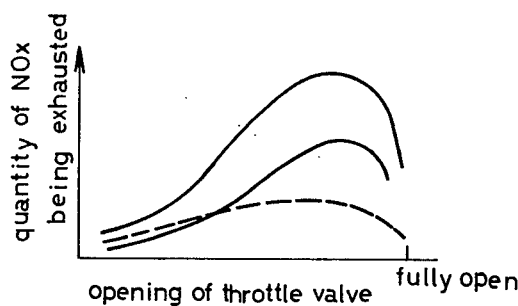
FIG. 7 is a plot showing the relationship between the throttle opening and the quantity of NOx exhausted, in the absence of recirculation of exhaust gases, in the cases of the proportioning type recirculation and the recirculation according to the present invention.
Figure 8:
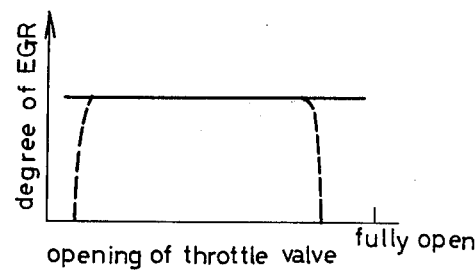
FIG. 8 is a plot showing the EGR characteristic curve of the first flow rate control valve according to the present invention (The relationship between the throttle opening and the quantity of intake air.)
Figure 10:
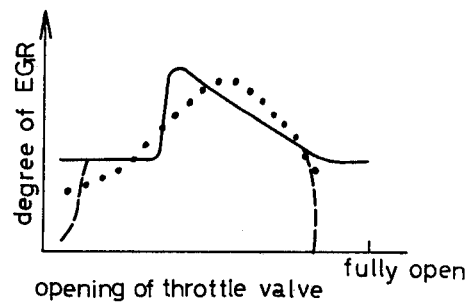
FIG. 10 is a plot showing the EGR characteristic curve of the EGR system according to the present invention, in case the first and second flow rate control valves are actuated.

The above relationship is expressed in FIG. 10. In FIG. 10, there is shown by the dotted line the characteristic desired for effectively reducing the quantity of NOx according to the recirculation of exhaust gases. In this respect, it is seen that the aforesaid characteristic given by the formula (4) substantially approximates the aforesaid desired characteristic. By imparting the aforesaid characteristic, the quantity of NOx being exhausted will be such as shown by the dotted line in FIG. 7, so there results excellent NOx reducing effect, as compared with the NOx reducing characteristic of EGR as given by the linear formula (as shown by a thin solid line in FIG. 7). Meanwhile, the thick solid line in FIG. 7 represents the quantity of NOx being exhausted in the absence of the recirculation of exhaust gases.

The aforesaid description has been referred to with reference to FIG. 1, i.e., the case where two flow rate control valves are provided separately. However, the same description goes for the integral type flow rate control valve 100, in which two flow rate control valves are mounted in integral fashion as shown in FIG. 2, with only each inlet being used in common. In this respect, the flow rate control valve 100 achieves the same function as those of the two flow rate control valves. In addition, the foregoing description may be similarly applied to the flow rate control valve 400 given in FIG. 6.

iv. The addition of the factors, which control the running condition of an engine and a vehicle, to the EGR system having the fundamental characteristic as described in the aforesaid paragraph (iii) enables the control of the flow rate of recirculating exhaust gases and the timing to recirculate exhaust gases. FIG. 3 shows the embodiment, wherein there are introduced into the EGR system those factors such as water temperature of an engine, vehicle speed, and transmission gear position (This will be referred to as gear position, hereinafter.). One example of the operations of the two flow rate control valves 1, 2 is shown as follows:

|  | Condition | The first flow rate control valve | The second flow rate control valve |
|---|---|---|---|
| Water temp. in engine | over 15° C | ON | OFF |
| " | over 60° C | ON | ON |
| Vehicle speed | 15 to 60 km/h | ON | ON |
| Gear position | top | OFF | ON |

In the above table, the term "ON" represents the condition of exhaust gases to be recirculated commensurate to the opening of the throttle valve of an engine according to the fundamental characteristic given in para. (iii), of the EGR system of the present invention. The term "OFF" means the condition of the exhaust gases failing to be recirculated, because the pressures in diaphragm chambers 201c, 202c of the flow rate control valves 201, 202 become equal to atmospheric pressure due to switching of the three way electromagnetic valves 30, 31 despite the opening of the throttle valve of the engine.

Figure 11:
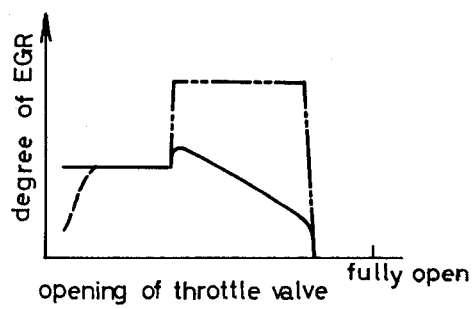
FIG. 11 is a plot showing the EGR characteristic curve of the control systems of FIGS. 4 and 5.

The combination of the control factors may be suitably selected according to not only the above table but also the requirement for reducing the quantity of NOx as well as the requirement for the running condition of a vehicle. The water temperature of an engine may be mechanically detected by means of a switching means 40 as shown in FIG. 4.

v. FIG. 5 shows another embodiment of a timing control system of an EGR system, in which acceleration is used as a control factor. For instance, the control system is so arranged that the second flow rate control valve is operated at a vehicle speed of 15 to 60 km/h in the range of the acceleration of 0.05g to 0.15g.

vi. In FIG. 11, the solid line represents the characteristic of the switching control of a flow rate restricting valve, when the recirculating exhaust gases passing through the first flow rate control valve are introduced into the intake system in the position upstream of the throttle valve 7 of an engine, with the control factors given in the previous paragraphs (iv) and (v) being used, while the recirculating exhaust gases passing through the second flow rate control valve is introduced into the intake system of an engine in a position downstream of the throttle valve 7 of the engine. On the other hand, the two point chain line represents the characteristic of the switching control of the flow rate control valves, when the recirculating exhaust gases passing through the first and second flow rate control valves are both introduced by way of EGR pipes 113, 118′ into the intake system 9 in a position upstream of the throttle valve 7.

The foregoing description and examples are presented herein for illustrative purposes only and are not intended to limit the scope of the invention as defined by the following claims.

What is claimed is:

1. An exhaust gas recirculating system for use in an internal combustion engine of a motor vehicle, comprising:
   first and second flow rate control valves, in which the interior of each of said valve is sealingly divided by means of a single diaphragm into one diaphragm chamber and a single valve chamber having one inlet and one outlet, a valve stem having a root portion with a valve body at its top secured to said diaphragm, said valve body being adapted to open and close each of said valves according to the motion of said diaphragm;
   a pipe communicating the inlet of said first flow rate control valve with the exhaust system of said engine;
   a pipe communicating the outlet of said first valve with the intake system of said engine in a position upstream of a throttle valve of said engine;
   a negative-pressure pipe communicating the diaphragm chamber of said first flow rate control valve with said intake system of said engine in a position slightly upstream of the idle position of said throttle valve;
   a pipe communicating the inlet of said second flow rate control valve with said exhaust system of said engine;
   a pipe communicating the outlet of said second flow rate control valve with said intake system of said engine in a position downstream of said throttle valve of said engine; and
   a pipe communicating said diaphragm chamber of said second flow rate control valve with said intake system of said engine in a position slightly upstream of the point where the first flow rate control valve is communicated with said intake system.

2. An exhaust gas recirculating system as set forth in claim 1, wherein said two flow rate control valves are assembled in integral fashion, with each inlet thereof being used in common, said inlet being communicated by way of a single pipe with said exhaust system of said engine.

3. An exhaust gas recirculating system as set forth in claim 2, wherein said two flow rate control valves are assembled, with their respective valve bodies being located in opposing relation to each other, with their respective valve stems being aligned, and with said inlet being provided in the body proper of said common valves at the junction of said two flow rate control valves.

4. An exhaust gas recirculating system as set forth in claim 2, wherein said two flow rate control valves are assembled, with their respective valve stems being located in the form of 'V' shape, said common inlet being provided in the body proper of said valves at the junction of said two flow rate control valves.

5. An exhaust gas recirculating system as set forth in claim 1, wherein a single, normally closed three way switching valve is provided in said respective negative-pressure pipes which communicate said diaphragm chambers of said two flow rate control valves with said intake system of said engine, each of said switching valve being controlled by means of a single controller which issues a valve-opening command upon receipt of signals from sensors sensing a given running conditions of said engine and said vehicle.

6. An exhaust gas recirculating system as set forth in claim 5, wherein said sensors are three in number and sense the temperature of the cooling water of said engine, the predetermined value of the vehicle speed, and the predetermined shift position of transmission gear.

7. An exhaust gas recirculating system as set forth in claim 1, wherein a single, normally closed three way switching valve is provided in said respective negative pressure pipes which communicate said diaphragm chambers of said two flow rate control valves with said intake system of said engine, said flow rate control valves being controlled by means of a controller which issues a valve-opening command upon receipt of signals from sensors sensing the predetermined running condition of said vehicle and by means of a water temperature controller utilizing the thermal expansion of wax.

8. An exhaust gas recirculating system as set forth in claim 7, wherein said controller for said first flow rate control valve is actuated according to signals from sensors sensing the vehicle speed and transmission gear position, said controller for said second flow rate control valve is actuated according to signals from sensors sensing the vehicle speed and vehicle acceleration.

* * * * *